(12) United States Patent  
Gouget

(10) Patent No.: US 11,063,743 B2  
(45) Date of Patent: Jul. 13, 2021

(54) METHOD OF RSA SIGNATURE OF DECRYPTION PROTECTED USING ASSYMETRIC MULTIPLICATIVE SPLITTING

(71) Applicant: THALES DIS FRANCE SA, Meudon (FR)

(72) Inventor: Aline Gouget, Meudon (FR)

(73) Assignee: THALES DIS FRANCE SA, Meudon (FR)

( * ) Notice: Subject to any disclaimer, the term of this patent is extended or adjusted under 35 U.S.C. 154(b) by 28 days.

(21) Appl. No.: 16/495,320

(22) PCT Filed: Mar. 20, 2018

(86) PCT No.: PCT/EP2018/056993  
§ 371 (c)(1),  
(2) Date: Sep. 18, 2019

(87) PCT Pub. No.: WO2018/172339  
PCT Pub. Date: Sep. 27, 2018

(65) Prior Publication Data  
US 2020/0112424 A1    Apr. 9, 2020

(30) Foreign Application Priority Data  
Mar. 21, 2017    (EP) .................................... 17305308

(51) Int. Cl.  
*H04L 29/06*    (2006.01)  
*H04L 9/00*    (2006.01)  
(Continued)

(52) U.S. Cl.  
CPC .............. *H04L 9/002* (2013.01); *H04L 9/085* (2013.01); *H04L 9/302* (2013.01); *H04L 2209/046* (2013.01); *H04L 2209/16* (2013.01)

(58) Field of Classification Search  
None  
See application file for complete search history.

(56) References Cited

U.S. PATENT DOCUMENTS 6,304,658 B1 * 10/2001 Kocher ................... G06F 7/723  
                                                       380/28  
7,191,333 B1 * 3/2007 Maddury ................ G06F 7/726  
                                                       713/174  
(Continued)

FOREIGN PATENT DOCUMENTS

EP           3091690 A1    11/2016  
WO    WO2013004691 A1    1/2013

OTHER PUBLICATIONS

Paul C Kocher Ed—Koblitz N (ED): "Timing Attacks on Implementations of Diffe-Hellman, RSA, DSS, and Other Systems", (Aug. 18, 1996), Advances in Cryptology—Crypto '96. 16th Annual International Cryptology Conference. Santa Barbara, Aug. 18-22, 1996. Proceedings; [Proceedings of the Annual International Cryptology Conference (Crypto)], Berlin, Springer, DE, pp. 104-113, XP019194419, ISBN: 978-3-540-61512-5 last paragraph of section 10.

(Continued)

*Primary Examiner* — Maung T Lwin  
(74) *Attorney, Agent, or Firm* — The Jansson Firm; Rehr B. Jansson

(57) ABSTRACT

Secure generation of an RSA signature of a message to be signed with a private exponent component d of an RSA key (p, q, N, d, e), by obtaining a hashed message, said hashed message being computed by hashing said message with a public hash function $H:\{0,1\}^* \to Z^*_N$, generating a first part of the RSA signature from said hashed message and said first private exponent component share, generating a second part of the RSA signature from said first part of the RSA signature and said second private exponent component (Continued)

share, determining the RSA signature from said second part of the RSA signature, and wherein the step of generation of a part of the RSA signature from the smaller private exponent component share among the first and second private exponent component shares is performed using a whitebox protection method and the step of generation of a part of the RSA signature from the bigger private exponent component share among the first and second private exponent component shares is performed using lower security requirements.

11 Claims, 3 Drawing Sheets

(51) Int. Cl.
    *H04L 9/08*          (2006.01)
    *H04L 9/30*          (2006.01)

(56) References Cited

U.S. PATENT DOCUMENTS

| | | | | |
|---|---|---|---|---|
| 7,327,847 | B2 * | 2/2008 | Cachin | H04L 9/085 |
| | | | | 380/286 |
| 7,594,275 | B2 * | 9/2009 | Zhu | G06F 21/10 |
| | | | | 713/180 |
| 8,499,149 | B2 * | 7/2013 | Chen | H04L 9/3247 |
| | | | | 713/158 |
| 9,130,757 | B2 * | 9/2015 | Fazio | H04L 9/3218 |
| 9,806,890 | B2 * | 10/2017 | Ibraimi | H04L 9/085 |
| 2001/0002486 | A1 * | 5/2001 | Kocher | H04L 9/002 |
| | | | | 713/171 |
| 2002/0186848 | A1 * | 12/2002 | Shaik | H04L 9/002 |
| | | | | 380/285 |
| 2003/0120931 | A1 * | 6/2003 | Hopkins | H04L 9/302 |
| | | | | 713/180 |
| 2006/0036853 | A1 * | 2/2006 | Chen | G06F 21/64 |
| | | | | 713/161 |
| 2014/0310527 | A1 * | 10/2014 | Veugen | H04L 9/065 |
| | | | | 713/171 |
| 2016/0323102 | A1 * | 11/2016 | Freudiger | H04L 9/0869 |
| 2017/0012948 | A1 * | 1/2017 | Peeters | H04L 9/3247 |

OTHER PUBLICATIONS

PCT/EP2018/056993, International Search Report, dated Jun. 4, 2018, European Patent Office, P.B. 5818 Patentlaan 2 NL-2280 HV Rijswijk.

PCT/EP2018/056993, Written Opinion of the International Searching Authority, dated Jun. 4, 2018, European Patent Office, D-80298 Munich.

* cited by examiner

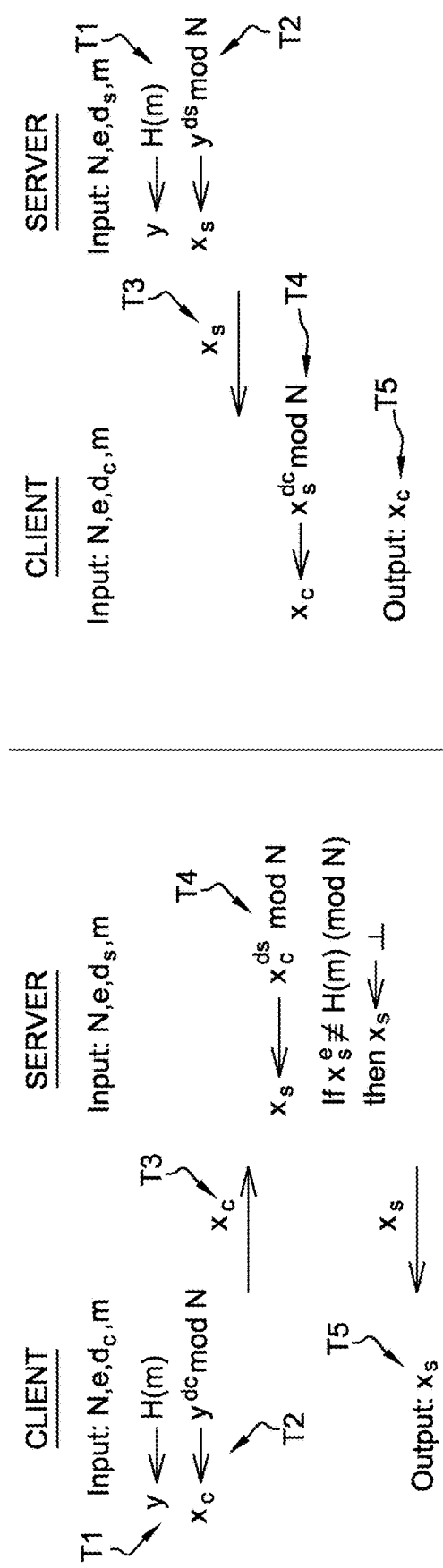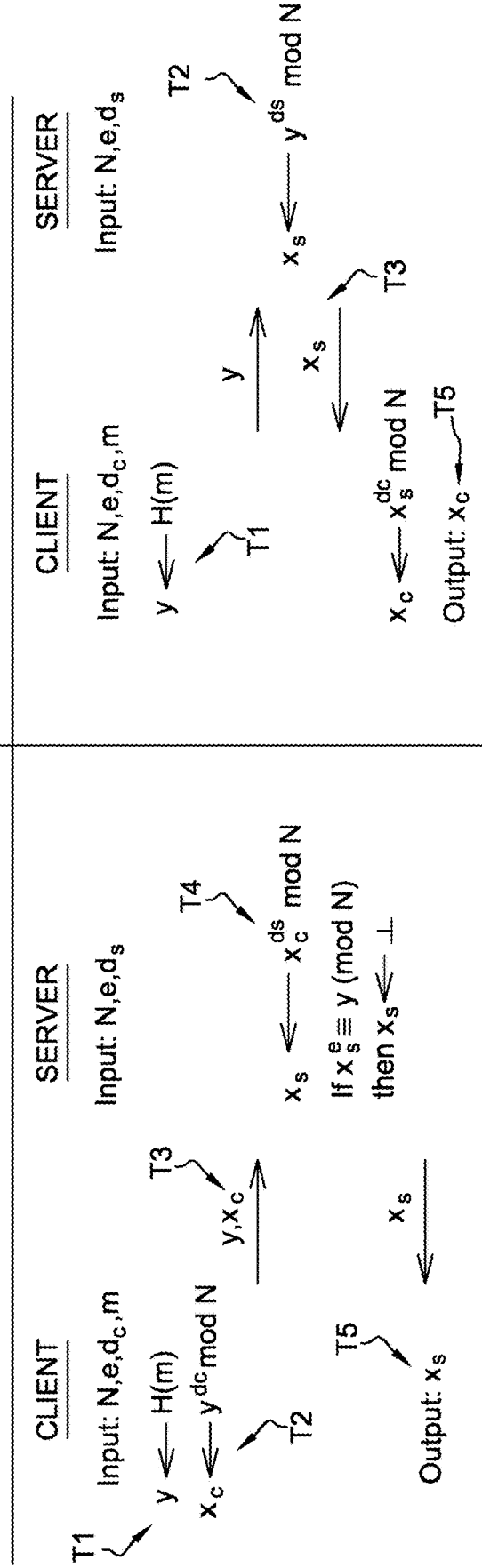
Fig. 5a  Fig. 5b  Fig. 5c  Fig. 5d

METHOD OF RSA SIGNATURE OF DECRYPTION PROTECTED USING ASSYMETRIC MULTIPLICATIVE SPLITTING

FIELD OF THE INVENTION

The present invention relates to the field of software implementation of an RSA signature/decryption and more particularly to cryptographic methods and devices allowing to keep cryptographic assets such as an RSA key secure even when subject to white-box attacks.

BACKGROUND OF THE INVENTION

A first application of cryptography is to provide mechanisms to protect data, such as messages exchanged on a communication channel, from being accessed by an unauthorized user. A plaintext piece of data may be protected by converting it into a ciphertext that may only be deciphered, i.e., converted back into the original data by someone or some device owning a secret key required for performing the deciphering operation.

Two major categories of cryptography are secret key cryptography and private-key-public-key cryptography (herein, simply referred to as public key cryptography). In public key cryptography, the recipient of a ciphertext message, i.e., the decrypting party, has a private key or secret key required to decipher ciphertext messages encrypted with the public key. In other words, there is an association between a particular private key and a particular public key; they form a key pair. The public key is made available to anyone who wishes to send an encrypted message (a ciphertext message) whereas the corresponding secret key is kept secret by the intended recipient of messages.

Public key cryptography can also be used for authenticating the issuer of a message. Such an issuer can generate a signature based on said message using his private key. The recipient of the message can then use the public key of the alleged issuer for verifying that the signature was generated using the associated private key ie that the issuer of the message is indeed who he claims to be. An example of widely used public key cryptosystem is Rivest-Shamir-Adelson (RSA) cryptosystem. Such a cryptosystem is based on the practical difficulty of factoring the product of two large prime numbers and uses a public key (e, N) and a private key d such that e·d=1 modulo phi(N), with N, d and e integers and phi( ) Euler's totient function. Typically, the value of e is chosen to be 3 or 65537. RSA cryptosystem allows publicly sharing the public key (e, N) for producing ciphertexts while enabling that only someone with knowledge of the private key d can decipher such ciphertexts and get knowledge of the private data enciphered in it. The private key can also be used to generate a signature for a message. Such a signature can then be verified by anyone using the associated public key. Of course the private key d must remain secret, otherwise any attacker having knowledge of the secret key could decipher ciphertext ciphered with the public key, and the privacy of enciphered data would not be guaranteed anymore. Such an attacker could also generate forged signatures of a message as if he was the true owner of the private key.

Traditionally, in order to ensure that the secret key remains secret, the decryption or signature algorithm is supposed to be executed in a secure environment only. The device executing such an algorithm is assumed trusted, preventing any attacker trying to decipher a secret message from accessing it. This is referred to as black box cryptography.

However, cryptographic processes are more and more deployed in applications executed on open devices. For example many user devices now have access to the Internet, such as PCs, tablets, smartphones, and can be used for playing copyrighted digital content such as audio or video files. Such files may be cryptographically protected, for example using digital rights management (DRM) files, in order to make it available to a user only as long as the user as subscribed to an online multimedia streaming service.

Cryptographic processes are then executed in an environment where not all users or devices can be trusted. Such a context is usually called a white-box attack context. In such a context, cryptosystems sensitive data such as private keys are vulnerable to attacks since the attacker has full access to the software implementation of the cryptographic processes. Binary code of such processes is completely accessible and editable by the attacker that can analyze the binary code of the cryptography application and, for example, memory pages or registers used for temporary storage during the execution. Such manipulations may, for example, be performed using debuggers and hardware emulation tools.

Software implementations of cryptosystems able to resist white-box attacks have been sought. In such implementations the private key may be provided on the subscriber's cryptographic device, e.g., a mobile device such as a mobile telephone, in a manner that it can be used by the device to decrypt or generate a signature without revealing the private key. The key might be hidden in some way inside the code implementing the decryption/signature algorithm and the algorithm may be obfuscated so that it is very difficult to determine where the key is hidden. The key's value might be also protected so that it is very difficult to determine it. This is referred to as white-box cryptography.

Unfortunately attacks have been designed that enable an attacker to retrieve a secret, such as an RSA secret key, from just a small portion of this secret. Such attacks called partial key exposure attacks further increase the security level required from cryptosystems in order to resist attacks in a whitebox environment. Typically, it is known that when the public exponent e is small, the knowledge of one fourth of the secret bits of d can be sufficient to reconstruct the full secret exponent d as mentioned by Everstine accessible at http://honors.cs.umd.edu/reports/lowexprsa.pdf.

There exist some cryptography mechanisms that would resist attacks in a white-box environment, including partial key exposure attacks, such as fully homomorphic encryption (FHE), introduced by Craig Gentry in 2009 in [Gentry] Fully Homomorphic Encryption Using Ideal Lattices, in Proceedings of the forty-first annual ACM symposium on Theory of computing (STOC '09), pp. 169-178. ACM, 2009. [Gentry] is incorporated herein by reference in its entirety.

However, current performances of such schemes applied to RSA cryptosystem are low and the computation time required for performing RSA cryptographic operations using such schemes is too high to enable a practical secure implementation of RSA in a white-box environment on existing user devices with low processing capabilities such as smartphones.

Therefore, there is a need for a software implementation, and an associated cryptographic device, of RSA cryptosystem secured in a white-box environment and achieving a computation time enabling practical application.

SUMMARY OF THE INVENTION

For this purpose and according to a first aspect, this invention therefore relates to a method of secure generation of an RSA signature (H(m)^d) of a message to be signed (m) with a private exponent component d of an RSA key (p, q, N, d, e),
where e is a public exponent component, N is a RSA modulus, p and q are primes such that N=p·q and e·d=1 modulo φ(N) with φ(.) Euler's function,
wherein said private exponent component of the RSA key is split into at least a first private exponent component share and a second private exponent component share, such that:
  the product of said private exponent component shares is equal to said private exponent component d modulo φ(N) ($d_1 \cdot d_2$=d (modulo φ(N))) and,
  one private exponent component share among said private exponent component shares, called server private exponent component share, is superior or equal to φ(N) and,
  other private exponent component shares among said private exponent component shares, called client private exponent component shares, are inferior to φ(N),
  the smaller private exponent component share among the first and second private exponent component shares being a client private exponent component share called primal client private exponent component share and the bigger private exponent component share being the server private exponent component share, said method comprising the following steps performed by a stand-alone client device comprising a memory, an interface and a processor:
    obtaining a hashed message, said hashed message being computed by hashing said message with a public hash function H:$\{0,1\}^* \to Z^*_N$;
    generating a first part of the RSA signature from said hashed message and said first private exponent component share,
    generating a second part of the RSA signature from said first part of the RSA signature and said second private exponent component share,
    determining the RSA signature from said second part of the RSA signature,
and wherein the step of generation of a part of the RSA signature from the primal client private exponent component share is performed using a whitebox protection method and the step of generation of a part of the RSA signature from the server private exponent component share is performed using lower security requirements.

Such a method enables to secure the whole RSA signature process in a whitebox context while requiring only the generation of one part of the RSA signature to be performed using protections against whitebox attacks, therefore speeding up the signature process. The way the private exponent component shares are generated ensures that protecting only a part of the signature generation prevents an attacker from retrieving the RSA private exponent component d, even in a whitebox context.

The first part $x_1$ of the RSA signature may be generated from the hashed message y and the first private exponent component share $d_1$ such that $x_1 = y^{d_1}$ modulo N.

The second part $x_2$ of the RSA signature may be generated from the first part $x_1$ of the RSA signature and the second private exponent component share $d_2$ such that $x_2 = x_1^{d_2}$ modulo N.

It enables to compute the RSA signature in two steps that may be protected using different security levels and performed by potentially different devices.

Said first private exponent component share, said second private exponent component share and an additional client device private exponent component share may be obtained by splitting said private exponent component of the RSA key such that:
  their product is equal to said private exponent component d modulo φ(N) and,
  one private exponent component share among said private exponent component shares, called server private exponent component share, is superior or equal to φ(N) and,
  other private exponent component shares among said private exponent component shares, called client private exponent component shares, are inferior to φ(N),
and the step of determining the RSA signature may comprise generating said RSA signature from said second part of the RSA signature and from said at least one additional client private exponent component share using a whitebox protection method different from the whitebox protection method used for generating said part of the RSA signature from the primal client private exponent component share.

It enables to protect the generation of one RSA signature using multiple different whitebox protection methods, making it even more difficult for an attacker to discover the private exponent component d.

The step of generation of a part of the RSA signature from the server private exponent component share, called server part, may be performed using ad-hoc obfuscation methods.

Using such obfuscation methods adds another level of security to the signature generation process.

According to a first ad-hoc obfuscation method, said server part of the RSA signature may be generated from a blinded server private exponent component share, said blinded server private exponent component share $d'_s$ being generated from said server private exponent component share ds such that $d'_s = d_s + r^* \varphi(N)$ with r a random value.

This countermeasure enables to change the server private exponent component share at each computation, thus not enabling an attacker the combine multiple traces when performing side-channel attacks, therefore preventing any differential power analysis attack.

According to a second ad-hoc obfuscation method, said server part of the RSA signature may generated modulo β*N with β a small value.

According to a third ad-hoc obfuscation method, said server part of the RSA signature may be generated using a standard square and multiply always method.

Said primal client private exponent component share may have a size among 80, 128, 160, 256, 300 bits or superior to 300 bits for a RSA modulus' size equal to 1024 bits.

Said server private exponent component share may have a size among 1024, 1024+64, 1024+128, 1024+256, 1024+512, 1024+896 bits for a RSA modulus' size equal to 1024 bits.

According to a second aspect, this invention therefore relates also to a computer program product directly loadable into the memory of at least one computer, comprising software code instructions for performing the steps of the methods according to the first aspect when said product is run on the computer.

According to a third aspect, this invention therefore relates also to a device comprising a memory, an interface and a processor configured to perform the steps of the method according to the first aspect.

BRIEF DESCRIPTION OF THE DRAWINGS

The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

FIG. 1 is a schematic illustration of a system comprising a client device and one or more sever devices according to an embodiment of the present invention;

FIGS. 5a, 5b, 5c, 5d illustrate schematically different method of secure generation of a RSA signature according to several embodiments of the present invention.

DETAILED DESCRIPTION OF EMBODIMENTS OF THE INVENTION

In the description detailed below, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The description detailed below is, therefore, not to be taken in a limiting sense, and the scope of the present invention is defined only by the appended claims, appropriately interpreted, along with the full range of equivalents to which the claims are entitled.

In the description below, notations under the form $x^{\wedge}y$ and $x^y$ are both used for the exponentiation operation.

The invention aims at solving the issue of securely implementing an RSA exponentiation with the RSA private exponent component d, for generating a signature or decrypting an RSA-encrypted message, in a white-box environment while ensuring reasonable performances. In order to do so, the invention proposes to split multiplicatively the private exponent component d into several, at least two, private exponent component shares and to compute securely, in a way resisting whitebox attacks, only a first part of the exponentiation, using some of the private exponent component shares. The rest of the exponentiation, using the rest of the private exponent component shares, may then be computed with lower security requirements and therefore at a lower cost.

Figure 1:
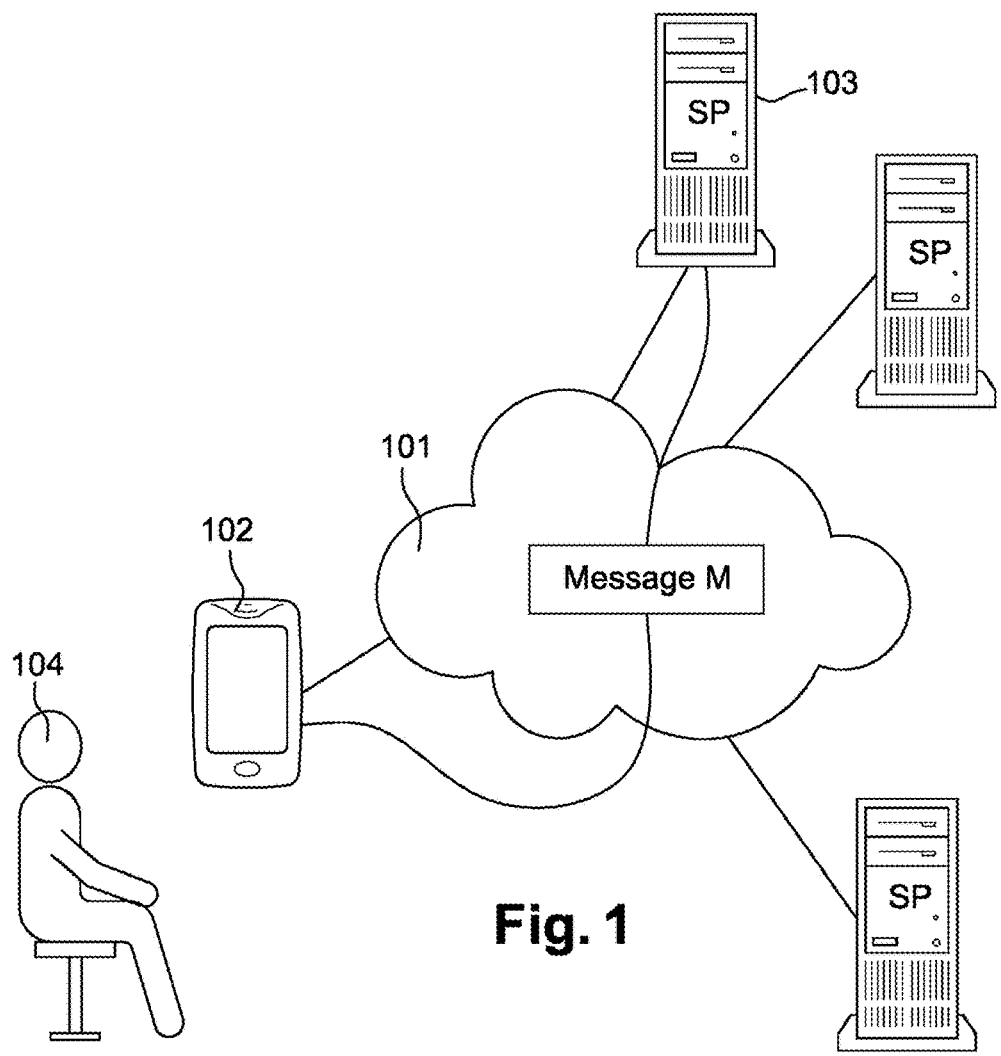

For that purpose, the invention provides a cryptographic system implementing such an RSA exponentiation, depicted on FIG. 1. Such a system includes at least a first cryptographic device 102 called client device, which is intrinsically secure, for example by being tamper resistant such as a smartcard, or which is configured to perform cryptographic operations using a calculation scheme secured against white-box attacks. As explained above, such a client device may be used at least to compute securely small parts of an exponentiation with the RSA private component d. Despite the potential cost of using cryptographic algorithms secured against white box attacks, such a client device may therefore have low processing capabilities. Such a client device may for example be a smart chip, a mobile telephone, a tablet, or a personal computer.

Such a client device may also compute the rest of the exponentiation, with lower security requirements for reaching an acceptable overall computation time. In order to lower the calculation load of the client device, the system may also include a second cryptographic device 103, called server device, which may be used to perform such other parts of the exponentiation, with a lower security level against white box attacks. Such a server device may for example be a mobile telephone, a tablet, a personal computer or a larger server computer. It may have a bigger processing power than the one of the client device.

The client device and the server device may be interconnected by a wired or wireless connection 101, such that the client device 102 may be operated by a user 104 and may then interact with the server device 103 in order to perform an RSA operation such as signing a message or deciphering an RSA enciphered message. Such a message may include DRM protected content, such as a computer program or a music library.

In a first exemplary embodiment, the client device is a standalone device, such as a smartcard, a mobile phone or a computer, computing all parts of the exponentiation, with different security levels.

In a second exemplary embodiment the client device is a smartcard inserted in a mobile phone which is the server device. Both are connected through the pins of the chip of the smartcard, according to ISO-7816 standard.

In a third exemplary embodiment, the client device is a desktop connected through the Internet using an Ethernet connection to a remote server which is the server device.

In a fourth exemplary embodiment, the client device is a mobile phone connected to a home laptop, which is the server device, through a wireless connection according to the IEEE 802.11 standard.

The RSA private exponent component d is split into a server private exponent component share, that is to be used for the RSA signature part computation with low security requirements, and one or more client private exponent component share, that shall be used only in securely computed computations. In order to save computation time, client private exponent component shares may be of small size compared to the server private exponent component share.

The client device holds the client private exponent component shares, and uses them to perform securely part of the RSA cryptographic operations. When the client device is a smart card, operations using such shares to compute part of the RSA exponentiation are secured by the impossibility for an attacker to access the content of the smart card without authorization, thus preventing such an attacker from retrieving the private exponent component shares stored by the client device. In other configurations, in which the client device shall be considered as a white box environment open to an attacker, such operations may be secured by computations schemes preventing any disclosure of the private exponent component shares, even in a whitebox environment, such as the DGHV scheme or a method using tables that embed secret encodings, as described further below.

Depending the chosen system configuration, the server private exponent component share may be held either by the client device, when it performs all the exponentiations operations, or by the server device when such a device is included in the system. The server private exponent component share is used to compute the other part of the exponentiation requiring a lower security level, therefore saving a lot of calculation time compared to an implementation requiring such a potentially heavy operation, given the larger size of the server private exponent component share, to be secured using for example DGHV scheme.

Operations using the server private exponent component share may nevertheless be protected by well-known ad hoc obfuscation methods described further below, in order to make it harder and longer for an attacker to retrieve the private exponent component share stored by the server device.

Figure 2:
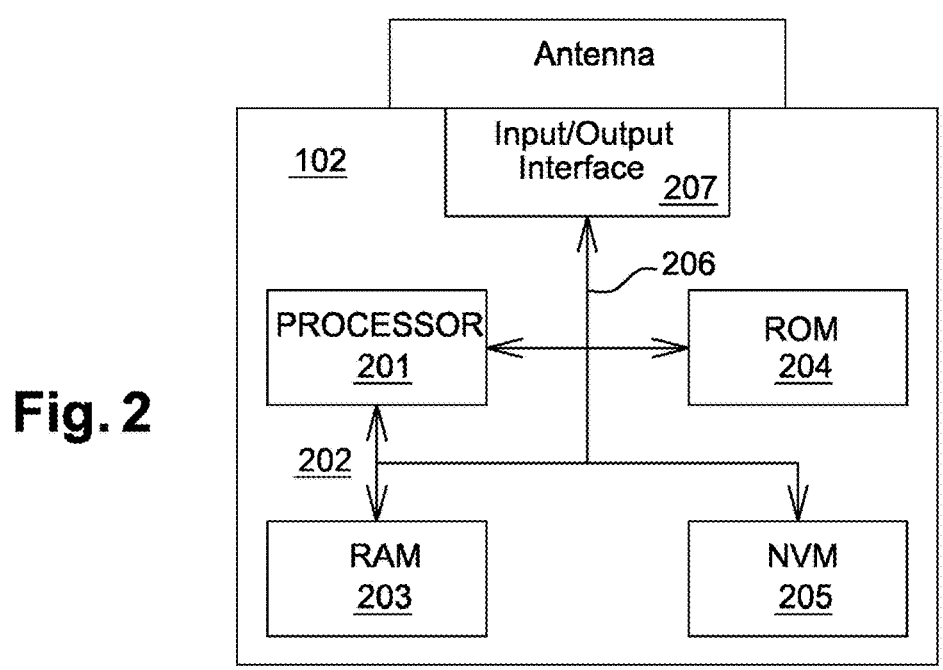
FIG. 2 is a schematic illustration of a client device according to an embodiment of the present invention.

FIG. 2 is a schematic illustration of a client device 102. The client device may include a processor 201 connected via a bus 206 to a random access memory (RAM) 203, a read-only memory (ROM) 204, and/or a non-volatile memory (NVM) 205. The client device further includes a connector connected to the processor and by which the client device may be connected to an antenna. Such an antenna may be used to connect the client device to various forms of wireless networks, e.g., wide-area networks, WiFi networks, or mobile telephony networks. Alternatively, the client device may connect to networks via wired network connections such as Ethernet.

Figure 3:
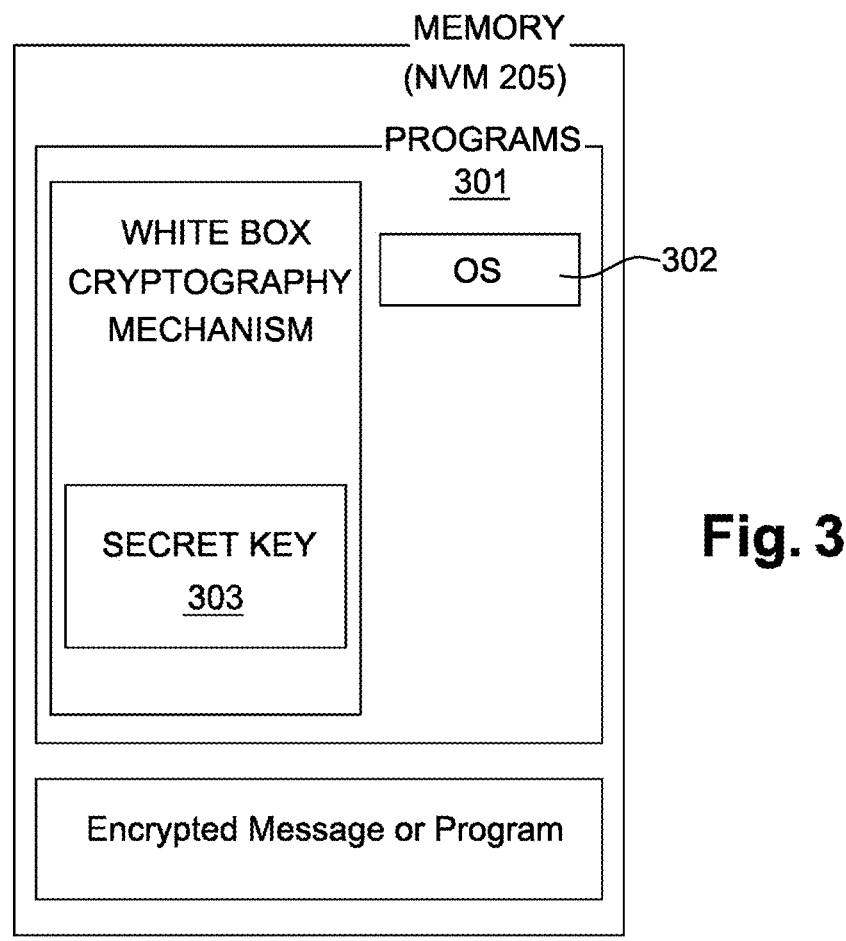
FIG. 3 is a schematic illustration of programs and data stored in a memory of the client device of FIG. 2.

The ROM 204 and/or NVM 205 may include computer programs 301 as is illustrated in FIG. 3. While it is here depicted that the computer programs 301 are all co-located in the ROM 204 or the NVM 205, in actual practice there is no such restriction as programs may be spread out over multiple memories and even temporarily installed in RAM 203. The programs 301 include operating system programs 302 as well as application programs loaded onto the client device 102. A sub-part of the memory, ROM and/or NVM, of the client device may store sensitive data 303 such as the one or more RSA private exponent component shares d1, d2 . . . . Such data may be stored under a FHE encrypted format as described here below.

The client device may also include an input/output interface 207 providing interfaces to the user of the client device, such as one or more screens, loudspeakers, a mouse, tactile surfaces, a keyboard etc. . . .

Figure 4:
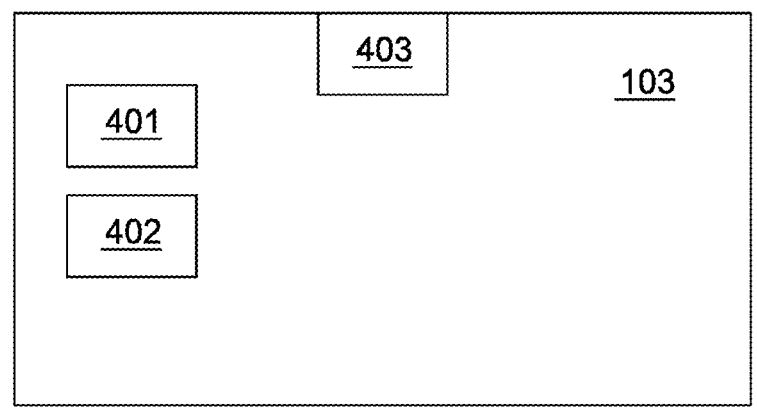
FIG. 4 illustrates schematically a server device according to an embodiment of the present invention.

As illustrated in the FIG. 4, the server device 103 includes at least a processor 401 for performing the operations needed for performing RSA cryptographic operations, a memory 402 such as a RAM, a ROM and/or a NVM, in which the server private exponent component share may be stored, and a wired or wireless network interface 403 for connecting to the network 103 and exchanging messages at least with the client device.

The following paragraphs describe the process generating the private exponent component shares distributed between the client device and the server device, if any. This generation process may be executed by a central entity that is a trusted split server configured to be connected to the client device and the server device if any or by one device among said client and server devices.

Such shares may be obtained by splitting an RSA key (p, q, N, d, e) where d is a private exponent component, e is a public exponent component, N is a RSA modulus, p and q are primes such that N=p·q and e·d=1 modulo φ(N) with φ(.) Euler's function. Such an RSA key may be generated by the split server by performing a standard RSA key generation process. N may be equal to 1024 or 2048 bits for example. Only the split server has the knowledge of the values N, φ(N) and d during the key generation process. For enhancing security, the values of d and φ(N) may be erased by the split server at the end of the key generation process. The split server may split the private exponent component d of the RSA key (p, q, N, d, e) in at least two private exponent component shares $d_1, d_2, \ldots$ using a multiplicative splitting. In that case, said at least two generated private exponent component shares $d_1, d_2, \ldots$ may be such that:

their product is equal to said private exponent component d modulo φ(N) e.g. $d_1, d_2$=d modulo φ(N),
one private exponent component share among said private exponent component shares, called server private exponent component share, is superior or equal to φ(N) and,
the other private exponent component shares among said private exponent component shares, called client private exponent component shares, are inferior to φ(N).

Said server private exponent component share may have a size among 1024, 1536, 1920 for a RSA modulus' size equal to 1024 bits, and for example among 2048, 3072 for a RSA modulus' size equal to 2048 bits.

Said client private exponent component shares may have a size among 80, 128, 160, 256, 300 bits (and superior to 300 bits) for a RSA modulus' size equal to 1024 bits or 2048 bits.

In a first exemplary embodiment, such a splitting may include:

generating randomly a client private exponent component share $d_c$ such that $1<d_c<\varphi(N)$ and $\gcd(d_c, \varphi(N))=1$;
computing a server private exponent component share ds such that $d_s=d*((d_c)^{\wedge}-1)$ modulo φ(N).

In a second exemplary embodiment, such a splitting may include:

generating randomly a server private exponent component share $d_s$ such that $d_s>\varphi(N)$ and $\gcd(d_s, \varphi(N))=1$;
computing a client private exponent component share $d_c$ such that $d_c=d*((d_s)^{\wedge}-1)$ modulo φ(N).

In both cases, in order to generate more than two private exponent component shares, the client private exponent component share $d_c$ may be further split into several client private exponent component shares $d_{ci}$, such that the server private exponent component share $d_s$ should be equal to $d*((d_{c1}, d_{c2} \ldots)^{\wedge}-1)$ modulo φ(N).

Then the split server may send the generated private exponent component shares and the RSA modulus N to the client device and to the server device, if any, so that they are stored in these devices.

The following paragraphs describe the steps of a method of secure generation of a RSA signature $H(m)^{\wedge}d$ of a message to be signed m with a private exponent component d of an RSA key (p, q, N, d, e), where e is a public exponent component, N is a RSA modulus, p and q are primes such that N=p·q and e·d=1 modulo φ(N) with φ(N.) Euler's function. This method may be performed by the client device alone or by the client device and the server device cooperating with each other according to a first aspect of the invention as depicted on FIGS. 5a to 5d.

Beforehand, a first private exponent component share $d_1$ and a second private exponent component share $d_2$ may be obtained by splitting said private exponent component d of the RSA key according to the method described above. The smaller private exponent component share among the first and second private exponent component shares is a client private exponent component share, stored by the client device. It may be called primal client private exponent component share in order to differentiate it from the other client private exponent component shares that may have been generated when splitting the private exponent component d. The bigger private exponent component share is the server private exponent component share, stored by the client device, when the client device performs all exponentiation calculations, or by the server device when the system includes a server device computing a part of the RSA exponentiation.

The method may comprise the following steps:
- obtaining T1 a hashed message y, said hashed message y being computed by hashing said message m with a public hash function H:$\{0,1\} \to Z^*_N$ e.g. y=H(m);
- generating T2 a first part $x_1$ of the RSA signature from said hashed message y and said first private exponent component share $d_1$,
- generating T4 a second part $x_2$ of the RSA signature from said first part $x_1$ of the RSA signature and said second private exponent component share $d_2$,
- determining T5 the RSA signature from said second part of the RSA signature $x_2$.

The implementation of these steps may vary depending on which private exponent component share is used first.

The primal client private exponent component share may be used first. In that case, the first private exponent component share $d_1$ is the primal client private exponent component share and the first part $x_1$ of the RSA signature is computed by the client device from the primal client private exponent component share. In such a case the second private exponent component share $d_2$ is the server private exponent component share and the second part $x_2$ of the RSA signature is computed by the client device or the server device, if any, from the server private exponent component share.

As explained above, in both cases, in order to generate more than two private exponent component shares, the client private exponent component share may be further split into several client device private exponent component shares dd.

Different exemplary signature schemes, illustrated on FIGS. 5a to 5d, are considered below. All these schemes are described as being performed by a client device and a server device cooperating with each other. Similar schemes can be performed by the client device alone, in which case the client device also performs the operations performed by the server device in the schemes described in the following paragraphs.

A first signature scheme is illustrated on FIGS. 5a and 5b. In this scheme, the primal client private exponent component share is used first by the client device for generating the first part $x_1$ of the RSA signature.

In a first step T1, the client device may obtain a hashed message y. Said hashed message y is computed by hashing said message to be signed m with a public hash function H:$\{0,1\}^* \to Z^*_N$ (y=H(m)).

In a second step T2, the client device may generate a client part $x_c$ of the RSA signature from said hashed message y and from said primal client private exponent component share $d_c$ or from the client private exponent component shares $d_{c1}$, $d_{c2}$ ... in case there is more than one. The client part $x_c$ of the RSA signature may be generated such that $x_c = y^{dc}$ modulo N. When K client private exponent component shares $d_{ci}$ have been generated, then the client part $x_c$ may be equal to $x_c = y^{\Pi d_{ci}}$ modulo N in a first embodiment or equal to $x_c = y^{dcj}$ with j in $\{1, \ldots, K\}$ in a second embodiment.

In a third step T3, the client device may send to the server device said client part of the RSA signature $x_c$. Optionally, the client device may send also said hashed message y for performing a verification, as illustrated on the FIG. 5b. Of course this step is not performed when the client device generates the RSA signature alone.

In a fourth step T4, the server device may generate a server part $x_s$ of the RSA signature from said client part $x_c$ of the RSA signature and from said server private exponent component share $d_s$. The server part $x_s$ of the RSA signature may be generated such that $x_s = x_c^{ds}$ modulo N. If said hashed message was sent, as illustrated on the FIG. 5b, the server device may verify that said sent hashed message y is equal to said server part $x_s$ raised to the power of said public exponent component e ($x_s^e$). If the server device already holds the message m, as illustrated on the FIG. 5a, the server device can compute the hashed message y from said held message m and can compare it to said generated server part $x_s$ raised to the power of said public exponent component e ($x_s^e$) If the verification is a failure, the method may be stopped.

In a fifth step T5, the server device sends the generated server part $x_s$ to the client device. The client device may determine the RSA signature as equal to the received server part or by computing $x_s^{\Pi d_{ei}}$ with i≠j in $\{1, \ldots, K\}$. When the client device generates the RSA signature alone, in this step it may determine the RSA signature as equal to the server part $x_s$ it previously generated or by computing $x_s^{\Pi d_{ei}}$ with i≠j in $\{1, \ldots, K\}$.

A second signature scheme is illustrated on the FIGS. 5c and 5d. In this scheme, the server private exponent component share is used first by the client device or the server device if any, for generating the first part $x_1$ of the RSA signature.

In a first step T1, the server device obtains a hashed message y. Said hashed message y is computed by hashing said message m with a public hash function H:$\{0,1\}^* \to Z^*_N$ (y=H(m)). If said server device holds said message m, as illustrated on the FIG. 5c, said hashed message y may be generated by said server device. Else, the client device may send said hashed message y to the server device as illustrated on the FIG. 5d.

In a second step T2, the server device generates a server part $x_s$ of the RSA signature from said hashed message y and from said server private exponent component share $d_s$. The server part $x_s$ of the RSA signature may be generated such that $x_s = y^{ds}$ modulo N.

In a third step T3, the server device sends to the client device, said server part of the RSA signature $x_s$. Of course this step is not performed when the client device generates the RSA signature alone.

In a fourth step T4, the client device generates a client part $x_c$ of the RSA signature from said server part $x_s$ of the RSA signature and from said client private exponent component share $d_c$ or from the client private exponent component shares $d_{c1}$, $d_{c2}$ ... in case there is more than one. The client part $x_c$ of the RSA signature may be generated such that $x_v = x_s^{dc}$ modulo N. When K client private exponent component shares $d_{ci}$ have been generated, then the client part $x_c$ may be equal to $x_s^{\Pi d_{ei}}$ modulo N with i in $\{1, \ldots, K\}$.

In a fifth step T5, the client device determines the RSA signature as equal to the generated client part $x_c$.

As explained above, the client device may be a tamper resistant device, such as a smartcard. In such a case, the step of generation of a part of the RSA signature from the primal client private exponent component share is performed by a tamper resistant device, and is therefore protected against with-box attacks from outside the client device.

Alternatively, the step of generation by the client device of a part of the RSA signature from the primal client private exponent component share or the step of determination of the RSA signature by the client device from a client private exponent component share may be performed using a whitebox protection method, and is therefore protected against whitebox attacks. The step of generation of the other part of the RSA signature from the server private exponent component share may then be performed by the server device, which is different from the client device and may have a lower security level without jeopardizing the security of the whole RSA signature process. The client private exponent component share having a small size, the computation time by the client device remains short even when applying a white-box protection method, which therefore enables a practical application. If the private exponent component d was split in several client private exponent component shares $d_{c,i}$, the steps of generation by the client device of a part of the RSA signature from the primal client private exponent component share and of determination of the RSA signature from the second part of the RSA signature $x_2$ and from said at least one additional client private exponent component share may be performed using different white-box protection methods to make more difficult attacks by attacker.

Any method enabling a protection of the private exponent component shares in a white-box environment may be considered. As an example, protection methods described here under using homomorphic encryption or using tables that embed secret encodings may be considered.

The patent application US2016/0239267 A1 illustrates an example of a white-box protection method using tables that embed secret encodings for computing a modular exponentiation. This method may be implemented to compute in a white-box environment: $x^{d2}$ modulo N where $x=H(m)$ or $x=H(m)^{d1}$ modulo N.

Below is given an example of a white-box protection method using homomorphic encryption. This method may be implemented to compute in a white-box environment: $x^{d2}$ modulo N where $x=H(m)$ or $x=H(m)^{d1}$ modulo N. $d_2$ is here a client private exponent component share of length in bits equal to t such that $d_2=(d_{2,1}, \ldots, d_{2,t})$ with $d_{2,i}$ in $\{0,1\}$ with for example t=128.

Prior to the computation of an exponentiation, in an initialization step, said client private exponent component share is divided in several sets, e.g. u sets $S_S$ with S in $\{1, \ldots, u\}$ of t/u elements: $d_2=(\{d_{2,1}, \ldots d_{2,t/u}\}, \{\ldots\}, \ldots, \{d_{2,t+1-t/u}, \ldots, d_{2,t}\})$. Then, said u sets are encrypted using the homomorphic encryption scheme DGHV and u different FHE secret keys $p_1, \ldots, p_u$ to generate encrypted client private exponent component bits: $ed_{2,i}=DGHV\,[p_j](d_{2,i})=p_j \cdot q_i + N \cdot r_i + d_{2,i}$ with $q_i$ and $r_i$ random integers. For example, the FHE secret key $p_1$ is used to encrypt the following t/u secret bits $\{d_{2,1}, \ldots d_{2,t/u}\}$, the FHE secret key $p_2$ is used to encrypt the following t/u secret bits $\{d_{2,1+t/u}, \ldots d_{2,2t/u}\}$, etc.

Then $2*(u-1)$ additional FHE-encrypted masks $ek_S$ and $einvk_S$ with S in $\{1, u-1\}$ are generated to manage key switching steps between said sets:

$ek_1=DGHV\,[p_1](k_1)=p_1 \cdot q_1 + N \cdot r_1 + k_1$
$einvk_1=DGHV\,[p_2](invk_1)=p_2 \cdot q'_2 + N \cdot r'_2 - k_1$
$ek_2=DGHV\,[p_2](k_2)=p_2 \cdot q_2 + N \cdot r_2 + k_2$
...
$einvk_{u-2}=DGHV\,[p_{u-1}](invk_{u-2})=p_{u-1} \cdot q'_{u-1} + N \cdot r'_{u-1} - k_{u-2}$
$ek_{u-1}=DGHV\,[p_{u-1}](k_{u-1})=p_{u-1} \cdot q_{u-1} + N \cdot r_{u-1} + k_{u-1}$
$einvk_{u-1}=DGHV\,[p_u](invk_{u-1})=p_u \cdot q'_u + N \cdot r'_u - k_{u-1}$ with $k_S$ a random value and $invk_S$ the opposite of said random value $k_S$. Thus, a random value $k_S$ is FHE-encrypted with the first FHE secret key $p_S$ to generate a FHE-encrypted mask $ek_S$ for a set $S_S$, and the inverse or opposite $invk_S$ of the random value $k_S$ is FHE encrypted with the second FHE secret key $p_{s+1}$ of a second set $S_{s+1}$ to generate a FHE-encrypted inverse mask $einvk_S$ for the set $S_S$.

Then, when generating a RSA signature, the computation of $X^{d2}$ mod N is done by performing the following steps:

combining x and the encrypted client private exponent component bits $ed_{2,i}$ by computing encrypted exponentiation bits a:

for i=1 to t, $c_i=(x^{(2^i)}-1 \bmod N)*ed_{2,i}+1$ for each of the u sets $S_S$, combining said encrypted exponentiation bits $c_i$ into encrypted exponentiation words $D_i$:

$D_1=c_1* \ldots *c_{t/u}$
$D_2=c_{t/u+1}* \ldots *c_{2t/u}$
...
$D_u=c_{(u-1)t/u+1}* \ldots *c_t$ Such a combination can be performed because all encrypted exponentiation bits a within a given set Ss are encrypted using the same secret key $p_S$.

combining said encrypted exponentiation words $D_1, \ldots, D_u$ with key-switching steps. Since each encrypted exponentiation word $D_i$ is encrypted using a different secret key, the FHE-encrypted masks $ek_S$ and $einvk_S$ may be used to switch the encryption of an encrypted exponentiation word from his secret key to the secret key of another encrypted exponentiation word, in order to enable combining them. Said combining comprising:

masking and decrypting with $p_1$: $E_1=D_1+ek_1$ modulo $p_1$ modulo N;
encrypting and unmasking with $p_2$: $E'_1=E_1+einvk_1$;
combining: $E''_1=D_2*E'_1$;
$E_2=E''_1+ek_2$ modulo $p_2$ modulo N;
...
$E'_{u-1}=E'_u+einvk_1$;
$E''_{u-1}=D_u*E'_{u-1}$;

$X^{d2}$ modulo N is equal to the last term combining all encrypted exponentiation words after FHE-decryption using the secret key $p_u$: $E''_{u-1}$ modulo $p_u$ modulo N.

It enables combining altogether multiple intermediate values under FHE-encrypted form, until getting a combination result that can be FHE-decrypted with little enough risk that an attacker could retrieve the client private exponent component share, i.e. part of the RSA private key, by attacking said combination result under FHE-decrypted form.

The step of generation of a part of the RSA signature $x_s$ by the client device or the server device if any from the server private exponent component share $d_s$ may be performed using ad-hoc obfuscation methods. The server private exponent component share $d_s$ having a larger size than the client private exponent component shares, it would be very costly to protect operations using it by white-box protection methods. Obfuscation methods then enable to bring an additional level of security without performing very costly operations.

A first ad-hoc obfuscation method may be an exponent blinding countermeasure. In this case, the server part $x_s$ of the RSA signature is generating from a blinded server private exponent component share $d'_s$. Said blinded server private exponent component share $d'_s$ is generated from said server private exponent component share $d_s$: $d'_s=d_s+r*\varphi(N)$ with r a random value. The value r may be chosen randomly by the split server and the blinded server private exponent component share $d'_s$ may be derived at each execution of the signature generation method. Thus by adding a random multiple of $\varphi(N)$ to the RSA private exponent component share at each execution, said blinded server private exponent component share $d'_s$ is randomized at each execution. This countermeasure has the feature to change the server private exponent component share at each computation, thus not enabling an attacker the combine multiple traces when performing side-channel attacks, therefore preventing any differential power analysis attack. For example the server private exponent component share $d_S$ and the blinded server private exponent component share $d'_s$ may have a size among 1024+64, 1024+128, 1024+256, 1024+512, 1024+896 bits for a RSA modulus' size equal to 1024 bits. The use of the exponent blinding countermeasure can be useful in a white-box environment in order to increase the number of bits that an attacker has to retrieve before being able to deduce the server device private exponent component share. Here, the computation of the server part $x_s$ of the RSA signature from the server private exponent component share $d_S$ or the blinded server private exponent component share $d_S'$ is a priori the most expensive computation that has to be done. However, with the proposed solution, since this step does not require a strong white-box protection, the impact on performances is strongly mitigated and it may be finally more efficient than the computation of the client part $x_c$ of the RSA signature from the client private exponent component share $d_c$.

Based on the current state-of-the art cryptanalysis, the attacker would have to recover first the full value $d_S$ or $d_S+r^*\varphi(N)$ and next at least a portion of the client device private exponent component share $d_c$ in order to be able to recover said private exponent component of the RSA key d.

A second ad-hoc obfuscation method may use a modulus blinding countermeasure. In this case, said server part $x_s$ of the RSA signature is generated modulo $\beta*N$ with $\beta$ a small value. Said small value $\beta$ may be randomly chosen by the split server during the key generation process or for each new signature generation.

A third ad-hoc obfuscation method may be a standard square and multiply always method used to perform a modular exponentiation and to generate said server part $x_s$ of the RSA signature.

The following paragraphs describe the steps of a method of secure RSA decryption, by a client device and a server device, of an RSA encrypted message c. All these steps may also be performed by the client device only, when the client device performs all the RSA decryption by himself. The message c has been encrypted with the public exponent component e of the RSA key (p, q, N, d, e).

In a first decryption step, the processor of the client or server device obtains the RSA encrypted message c.

In a second decryption step, the processor of the same device generates a first part of the decrypted message from said RSA encrypted message c and said first private exponent component share $d_1$: $x_1 = c^{d_1}$ modulo N.

In a third decryption step, the processor of the same device sends to the other device said first part $x_1$. The step is not performed when all steps are performed by the client device alone.

In a fourth decryption step, the other device generates a second part of the decrypted message from said first part of the decrypted message $x_1$ and said second private exponent component share $d_2$: $x_2 = x_1^{d_2}$ modulo N.

The decrypted message is thus obtained.

The implementation of each step of decryption method may be identical to the implementation of the corresponding signature step described above, except that computations applied to the message m in signature steps are applied to the RSA encrypted message c.

The methods described here above thus enable to perform RSA cryptographic operations such as signature generation or decryption with a strong security against any white-box attack, while having much lower processing power requirements than existing white-box cryptographic schemes, therefore enabling practical applications even on light devices with low processing capabilities.

The invention claimed is:

1. A method of operating a standalone client device, having a memory, an interface, and a processor, to securely generate an RSA (Rivest-Shamir-Adleman) signature (H(m)^d) of a message (m), wherein d is a private exponent component of an RSA key (p, q, N, d, e),
   where e is a public exponent component, N is a RSA modulus, p and q are primes such that N=p·q and e·d=1 modulo $\varphi(N)$ with $\varphi(.)$ Euler's function, wherein said private exponent component (d) of the RSA key is split into at least a first private exponent component share ($d_1$) and a second private exponent component share ($d_2$) such that:
      the product of said first private exponent component share and said second private exponent component share is equal to said private exponent component d modulo $\varphi(N)$ ($d_1, d_2 = d$ (modulo $\varphi(N)$)) and,
      one private exponent component share among said first and second private exponent component shares is superior or equal to $\varphi(N)$ and,
      the other private exponent component share among said first and second private exponent component shares is inferior to $\varphi(N)$,
   said method comprising:
      obtaining, by the standalone client device, a hashed message (y), said hashed message (y) being computed by hashing said message (m) with a public hash function H:$\{0,1\}^* \to Z^*N$ (y=H(m));
      generating, by the standalone client device, a first part ($x_1$) of the RSA signature from said hashed message (y) and said first private exponent component share ($d_1$),
      generating, by the standalone client device, a second part ($x_2$) of the RSA signature from said first part ($x_1$) of the RSA signature and said second private exponent component share ($d_2$),
      determining, by the standalone client device, the RSA signature from said second part of the RSA signature ($x_2$),
   and wherein the step of generation of a part of the RSA signature from the smaller private exponent component share among the first and second private exponent component shares is performed using a whitebox protection method and the step of generation of a part of the RSA signature from the bigger private exponent component share among the first and second private exponent component shares is performed using lower security requirements.

2. The method of claim 1, wherein the first part $x_1$ of the RSA signature is generated from the hashed message y and the first private exponent component share $d_1$ such that $x_1 = y^{d_1}$ modulo N.

3. The method of claim 1, wherein the second part $x_2$ of the RSA signature is generated from the first part $x_1$ of the RSA signature and the second private exponent component share $d_2$ such that $x_2 = x_1^{d_2}$ modulo N.

4. The method of claim 1, wherein said first private exponent component share ($d_1$), said second private exponent component share ($d_2$) and an additional private exponent component share ($d_3$) are obtained by splitting said private exponent component (d) of the RSA key
   and wherein the step of determining the RSA signature comprises generating said RSA signature from said second part of the RSA signature ($x_2$) and from said at least one additional private exponent component share ($d_3$) using a whitebox protection method different from the whitebox protection method used for generating said part of the RSA signature from the smaller private exponent component share among the first and second private exponent component.

5. The method of claim 1, wherein the step of generation of a part of the RSA signature ($x_s$) from the bigger private exponent component share ($d_s$) is performed using ad-hoc obfuscation methods.

6. The method of claim 5, wherein said server part ($x_s$) of the RSA signature generated from the bigger private exponent component share is generated from a blinded server private exponent component share ($d'_s$), said blinded private exponent component share $d'_s$ being generated from said bigger private exponent component share $d_s$ such that $d'_s = d_s + r * \varphi(N)$ with r a random value.

7. The method of claim 5, wherein said part ($x_s$) of the RSA signature generated from the bigger private exponent component share is generated using a standard square and multiply always method.

8. The method of claim 1, wherein said smaller private exponent component share among the first and second private exponent component shares has a size among 80, 128, 160, 256, 300 bits or superior to 300 bits for a RSA modulus' size equal to 1024 bits.

9. The method of claim 1, wherein said bigger private exponent component share has a size among 1024, 64+1024, 128+1024, 256+1024, 512+1024, 896+1024 bits for a RSA modulus' size equal to 1024 bits.

10. A non-transitory memory comprising a computer program product, comprising software code instructions for causing a processor of a computer to perform a method of secure generation of an RSA (Rivest-Shamir-Adleman) signature (H(m)^d) of a message (m), wherein d is a private exponent component of an RSA key (p, q, N, d, e), where e is a public exponent component, N is a RSA modulus, p and q are primes such that N=p·q and e·d=1 modulo $\varphi(N)$ with $\varphi(.)$ Euler's function, wherein said private exponent component (d) of the RSA key is split into at least a first private exponent component share ($d_1$) and a second private exponent component share ($d_2$) such that:
the product of said first private exponent component share and said second private exponent component share is equal to said private exponent component d modulo $\varphi(N)$ ($d_1$, $d_2$=d (modulo $\varphi(N)$)) and,
one private exponent component share among said first and second private exponent component shares is superior or equal to $\varphi(N)$ and,
the other private exponent component share among said first and second private exponent component shares is inferior to $\varphi(N)$,
said method comprising:
obtaining, by the standalone client device, a hashed message (y), said hashed message (y) being computed by hashing said message (m) with a public hash function H:{0,1}*→Z*N (y=H(m));
generating, by the standalone client device, a first part ($x_1$) of the RSA signature from said hashed message (y) and said first private exponent component share ($d_1$),
generating, by the standalone client device, a second part ($x_2$) of the RSA signature from said first part ($x_1$) of the RSA signature and said second private exponent component share ($d_2$),
determining, by the standalone client device, the RSA signature from said second part of the RSA signature ($x_2$),
and wherein the step of generation of a part of the RSA signature from the smaller private exponent component share among the first and second private exponent component shares is performed using a whitebox protection method and the step of generation of a part of the RSA signature from the bigger private exponent component share among the first and second private exponent component shares is performed using lower security requirements when said product is run on the computer.

11. A device comprising a memory, an interface and a processor configured to perform a method of secure generation of an RSA (Rivest-Shamir-Adleman) signature (H(m)^d) of a message (m), wherein d is a private exponent component of an RSA key (p, q, N, d, e), where e is a public exponent component, N is a RSA modulus, p and q are primes such that N=p·q and e·d=1 modulo $\varphi(N)$ with $\varphi(.)$ Euler's function, wherein said private exponent component (d) of the RSA key is split into at least a first private exponent component share ($d_1$) and a second private exponent component share ($d_2$) such that:
the product of said first private exponent component share and said second private exponent component share is equal to said private exponent component d modulo $\varphi(N)$ ($d_1$, $d_2$=d (modulo $\varphi(N)$)) and,
one private exponent component share among said first and second private exponent component shares is superior or equal to $\varphi(N)$ and,
the other private exponent component share among said first and second private exponent component shares is inferior to $\varphi(N)$,
said method comprising:
obtaining, by the standalone client device, a hashed message (y), said hashed message (y) being computed by hashing said message (m) with a public hash function H:{0,1}*→Z*N (y=H(m));
generating, by the standalone client device, a first part ($x_1$) of the RSA signature from said hashed message (y) and said first private exponent component share ($d_1$),
generating, by the standalone client device, a second part ($x_2$) of the RSA signature from said first part ($x_1$) of the RSA signature and said second private exponent component share ($d_2$),
determining, by the standalone client device, the RSA signature from said second part of the RSA signature ($x_2$),
and wherein the step of generation of a part of the RSA signature from the smaller private exponent component share among the first and second private exponent component shares is performed using a whitebox protection method and the step of generation of a part of the RSA signature from the bigger private exponent component share among the first and second private exponent component shares is performed using lower security requirements.

* * * * *